(12) United States Patent
Surminski et al.

(10) Patent No.: US 10,401,049 B2
(45) Date of Patent: Sep. 3, 2019

(54) LAMINAR FLOW DIFFUSER WITH INTEGRATED LIGHTING

(71) Applicant: PRICE INDUSTRIES LIMITED, Winnipeg (CA)

(72) Inventors: David Mark Surminski, Winnipeg (CA); Dirk Arthur Kelsch, Winnipeg (CA); Jeffrey Shaun Ramirez, Winnipeg (CA); Nolan Gerald Hosking, Atlanta, GA (US); Sylvia Bistrong, Miami, FL (US); Gustavo F. Cardero, Miami, FL (US)

(73) Assignee: Price Industries Limited, Winnipeg, Manitoba (CA)

( * ) Notice: Subject to any disclaimer, the term of this patent is extended or adjusted under 35 U.S.C. 154(b) by 0 days.

(21) Appl. No.: 15/594,114

(22) Filed: May 12, 2017

(65) Prior Publication Data
US 2018/0003406 A1     Jan. 4, 2018

Related U.S. Application Data

(60) Provisional application No. 62/335,251, filed on May 12, 2016.

(51) Int. Cl.
*F24F 13/08*     (2006.01)
*F24F 13/068*    (2006.01)
(Continued)

(52) U.S. Cl.
CPC ........ *F24F 13/068* (2013.01); *F21V 33/0088* (2013.01); *F24F 13/078* (2013.01);
(Continued)

(58) Field of Classification Search
USPC .......................................................... 454/296
See application file for complete search history.

(56) References Cited

U.S. PATENT DOCUMENTS

| RE25,216 | E | * | 8/1962 | Kennedy | ............... | F24F 13/068 |
|---|---|---|---|---|---|---|
| | | | | | | 454/298 |
| 4,030,518 | A | * | 6/1977 | Wilcox | ..................... | E04B 9/02 |
| | | | | | | 137/246 |

(Continued)

FOREIGN PATENT DOCUMENTS

| FR | 2764933 A1 | * | 12/1998 | ............. | E04B 9/006 |
|---|---|---|---|---|---|
| FR | 2982927 B1 | * | 3/2015 | ............. | F24F 13/28 |

(Continued)

*Primary Examiner* — Gregory L Huson
*Assistant Examiner* — Frances F. Hamilton
(74) *Attorney, Agent, or Firm* — Smith, Gambrell & Russell, LLP

(57) ABSTRACT

A laminar flow diffuser with integrated lighting has a frame for supporting an air plenum and a lower housing. The air plenum receives conditioned air from a source of conditioned. The lower housing is attached to the bottom of the plenum. An aperture plate damper installed below the top plenum regulates the flow of air from the plenum through the laminar flow diffuser. A clear or translucent engineered, fire rated polymer perforated diffuser face forms the outlet from the lower housing to the room below. LED strips are positioned around the inside periphery of the lower housing. A light guide is installed adjacent the LED lighting strips to spread the light across the area of the perforated diffuser face.

6 Claims, 6 Drawing Sheets

(51) Int. Cl.
  *F21V 33/00* (2006.01)
  *F24F 13/078* (2006.01)
  *F21Y 103/10* (2016.01)
  *F21Y 115/10* (2016.01)
  *E04B 9/02* (2006.01)
  *F24F 3/16* (2006.01)
  *F24F 7/10* (2006.01)
  *F21V 8/00* (2006.01)

(52) U.S. Cl.
  CPC ............ *E04B 9/02* (2013.01); *F21Y 2103/10* (2016.08); *F21Y 2115/10* (2016.08); *F24F 3/161* (2013.01); *F24F 7/10* (2013.01); *F24F 13/08* (2013.01); *G02B 6/0036* (2013.01); *G02B 6/0095* (2013.01)

(56) References Cited

U.S. PATENT DOCUMENTS

| | | | | |
|---|---|---|---|---|
| 4,666,477 A * | 5/1987 | Lough | ............... | B01D 46/10 137/625.3 |
| 5,207,614 A * | 5/1993 | Passadore | ............... | F24F 13/12 137/625.3 |
| 7,140,551 B2 * | 11/2006 | de Pauw | ............... | G05D 23/1902 236/94 |
| 7,988,331 B2 * | 8/2011 | Zheng | ............... | F21S 8/02 362/249.02 |
| 8,382,332 B2 * | 2/2013 | Zakula | ............... | F21S 8/026 362/294 |
| 9,022,596 B2 * | 5/2015 | Hopper | ............... | F24F 7/02 362/219 |
| 9,140,462 B2 * | 9/2015 | Hanai | ............... | F24F 3/166 |
| 9,341,387 B2 * | 5/2016 | Cursetjee | ............... | F24F 13/078 |
| 9,945,577 B2 * | 4/2018 | Kim | ............... | A61M 21/02 |
| 2009/0298406 A1 * | 12/2009 | Norbury, Jr. | ............... | B60H 1/34 454/69 |
| 2011/0122603 A1 * | 5/2011 | Shamshoian | ............... | E04B 9/02 362/149 |
| 2011/0228554 A1 | 9/2011 | Watanabe | | |
| 2013/0088855 A1 * | 4/2013 | Ye | ............... | F24F 13/078 362/96 |
| 2014/0185305 A1 * | 7/2014 | Takahashi | ............... | F21V 29/02 362/373 |
| 2014/0273803 A1 | 9/2014 | Fontanesi | | |
| 2014/0355248 A1 | 12/2014 | Cursetjee | | |
| 2015/0109765 A1 * | 4/2015 | Sepkhanov | ............... | E04B 1/86 362/147 |
| 2017/0261222 A1 * | 9/2017 | Zakula | ............... | F21S 8/026 |

FOREIGN PATENT DOCUMENTS

| | | | | |
|---|---|---|---|---|
| FR | 2982927 B1 * | 3/2015 | ............ | F24F 13/28 |
| WO | WO 2010046536 * | 4/2010 | ............ | F24F 1/0007 |

* cited by examiner

LAMINAR FLOW DIFFUSER WITH INTEGRATED LIGHTING

CLAIM OF PRIORITY

The present application claims priority from Provisional Patent Application No. 62/335,251, filed on May 12, 2016, the disclosure of which is relied upon and incorporated herein in its entirety by reference.

FIELD OF THE INVENTION

This invention relates to air diffusers and more particularly to a laminar flow diffuser with integrated lighting.

BACKGROUND OF THE INVENTION

Laminar flow diffusers are located in the ceiling of a room immediately above a work area and deliver a controlled downward flow of conditioned supply air with minimal entrainment of residual room air. The low entrainment of residual room air results from the low initial face velocity of the air delivered by the laminar flow diffuser. The uniform low velocity downward projection of supply air through a diffuser face, combined with low-level exhaust or return air inlets, is ideal for industrial clean rooms or hospital operating rooms. The boundary layer of the air mass in the room is the only place where any appreciable entrainment of residual room air may occur. With the boundary layer, remote from the work area, the low velocity controlled air mass delivered from the laminar flow diffuser effectively isolates the work area from any effects or contaminants of the residual room air.

Laminar flow diffusers typically have a full flow butterfly style dampers to control the amount of air delivered downwardly through the diffuser face to the room below. The laminar flow diffusers are typically configured and sized for either ceiling surface mount or for ceiling T-bar installation.

Because of the low flow of the laminar flow diffusers, a substantial portion of the ceiling may be occupied by the laminar flow diffusers. Such a construction creates a possible trade-off between the ceiling area allocated to the laminar flow diffusers and the ceiling area allocated to lighting fixtures. Such a trade-off becomes particularly acute in work areas that require a high degree of illumination as well as a low degree of contaminant entrainment, such as hospital operating rooms or industrial clean rooms.

SUMMARY OF THE INVENTION

In order to address the issue of limited ceiling space for both laminar flow diffusers and lighting fixtures, the present invention is a laminar flow diffuser with integrated light emitting diodes (LED). The laminar flow diffuser of the present invention includes a frame that supports an enclosed air plenum and a lower housing. The air plenum receives conditioned air from a source of conditioned air and includes a top panel, side panels, end panels, and an open bottom. A lower housing, comprising housing side panels and housing end panels, is attached to the bottom of the plenum. An aperture plate damper is installed below the air plenum to control air flow through the diffuser. A clear or translucent engineered, fire rated polymer perforated diffuser face forms the outlet from the lower housing to the room below. The perforated diffuser face is approximately ⅛ inch in thickness.

The LED lighting comprises integrated LED lighting strips that are mounted on the inside of the lower housing sides and lower housing ends and above the perforated diffuser face. The LED lighting is designed such that an equivalent amount of light is provided from the laminar flow diffuser, as would have been provided by separate lights and diffusers.

Optionally, an integrated acrylic light guide is used to equalize the light emitted through the perforated diffuser face of the laminar flow diffuser. The light guide comprises a ⅜ inch clear acrylic sheet with a reflective metal sheet mounted on top of the light guide polymer sheet. The reflective metal sheet reflects the light transmitted through the light guide downward toward the perforated diffuser face and prevents light from being emitted inefficiently from the top of the light guide. The light guide is perforated to allow for necessary air flow to pass through the light guide, through the perforated diffuser face, and into the room below. The light guide is mounted adjacent to the LED strips and in the same plane as the LED strips. The light produced by the LED strips passes within the clear acrylic sheet of the light guide, and the light guide fully equalizes the light within the laminar flow diffuser before the light is emitted from the perforated diffuser face of the laminar flow diffuser. The light guide is positioned directly above, spaced from, and parallel to the diffuse face in order to transfer the maximum amount of light from the LED strips to the translucent perforated diffuser face and to provide a high quality, equalized, and even light to be emitted from the perforated diffuser face of the laminar flow diffuser.

The invention includes individual laminar flow diffuse and larger integrated assemblies of individual laminar flow diffusers. The individual laminar flow diffusers generally are dimensioned to fit the standard T-bar ceiling installations, having nominal dimensions of 24 inches×24 inches or 24 inches×48 inches.

In the larger integrated assemblies of individual laminar flow diffusers, the conditioned air supplied from a source of conditioned air is shared amongst the several laminar flow diffusers that are either individually connected to air ducts or interconnected with a common air plenum. The air flow between the plenums for the individual laminar flow diffusers is internally equalized due to the back pressure created by the aperture plate damper within each laminar flow diffuser. Balancing the air flow from each laminar flow diffuser is accomplished with the face adjustable aperture plates installed in each laminar flow diffuser.

As a result of the integrated lighting in the laminar flow diffuser, the lighting and the air distribution by the laminar flow diffusers are integrated into the same ceiling space thereby saving ceiling space in operating rooms and clean rooms.

Further objects, features and advantages will become apparent upon consideration of the following detailed description of the invention when taken in conjunction with the drawings and the appended claims.

DETAILED DESCRIPTION OF THE PREFERRED EMBODIMENT

Figure 1:
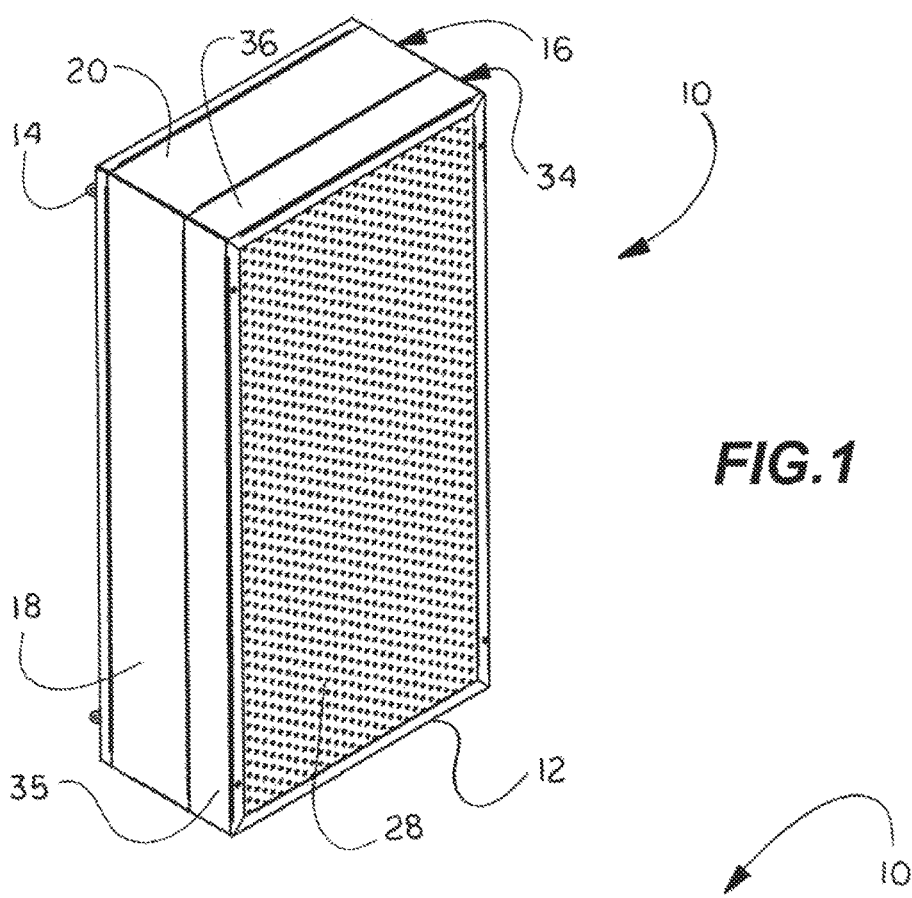
FIG. 1 is a side perspective view of an individual laminar flow diffuser with integrated lighting in accordance with the present invention.
Figure 2:
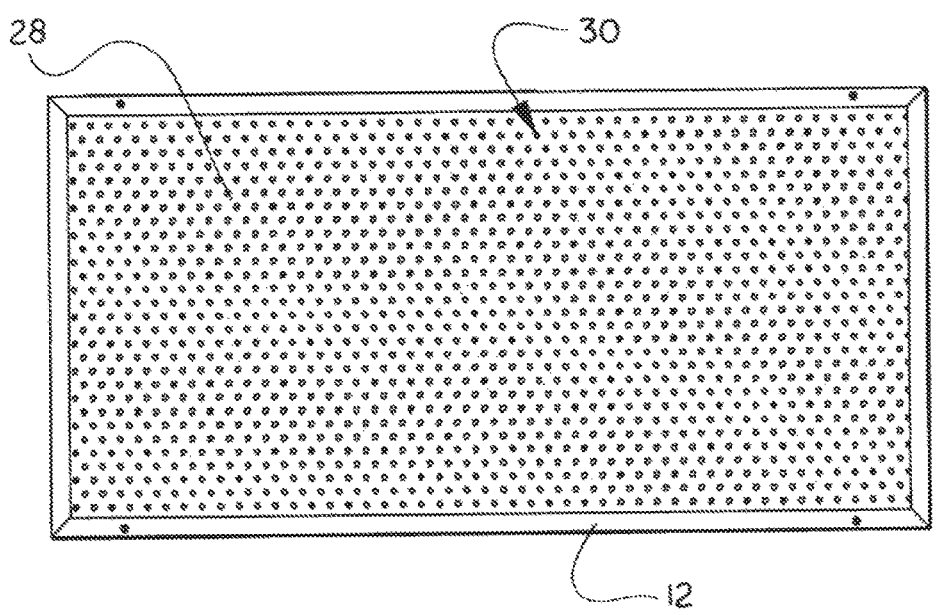
FIG. 2 is a bottom plan view of the individual laminar flow diffuser with integrated lighting in accordance with the present invention.

FIGS. 1, 2, 3A-B, and 4A-E illustrate an individual laminar flow diffuser 10 of the present invention. The laminar flow diffuser 10 includes a frame 12 that supports a plenum 16 and a lower housing 34. In other embodiments, the plenum 16 and the lower housing 34 may be a single structure divided into two sections. Such laminar flow diffusers 10 generally are dimensioned to fit the standard T-bar ceiling installations and have nominal dimensions of 24 inches×24 inches or 24 inches×48 inches. The laminar flow diffuser 10 is mounted in a T-bar ceiling of an occupied space by means of mounting hooks 14 attached to the frame 12.

The plenum 16 includes side panels 18, end panels 20, a top panel 22 and an open bottom. The lower housing 34 is attached to the open bottom of the plenum 16. In one embodiment the lower housing 34 has a peripheral panel comprising housing side panels 35 and housing end panels 36. The peripheral panel, however, may in other embodiments be a continuous panel or have additional panels. The plenum 16 and the lower housing 34 are separated from each other by an aperture plate damper 38 that regulates the flow of air from the plenum 16 into the lower housing 34.

A clear or translucent engineered fire rated polymer perforated diffuser face 28 is connected to the bottom of the lower housing 34. The polymer perforated diffuser 28 face is made of ⅛" thick polycarbonate and perforated with openings 30 to produce 13% to 23% free (open) area. The perforated diffuser face 28 allows conditioned air to flow freely into the room below with minimal pressure drop and allows for adequate flow equalization across the perforated face 28 thereby producing ideal laminar air flow characteristics in the room below. The translucent perforated diffuser face 28 is attached to the bottom of the frame 12 by means of quick release fasteners or threaded bolts 40 so that the perforated diffuser face 28 can be removed for maintenance and cleaning. While the illustrated diffuser has a flat rectangular perforated diffuser face 28, the diffuser of the present invention is not limited to such a flat rectangular perforated diffuser face and may incorporate other embodiments of diffuser outlets well known to those of ordinary skill in the art.

Figure 3A:
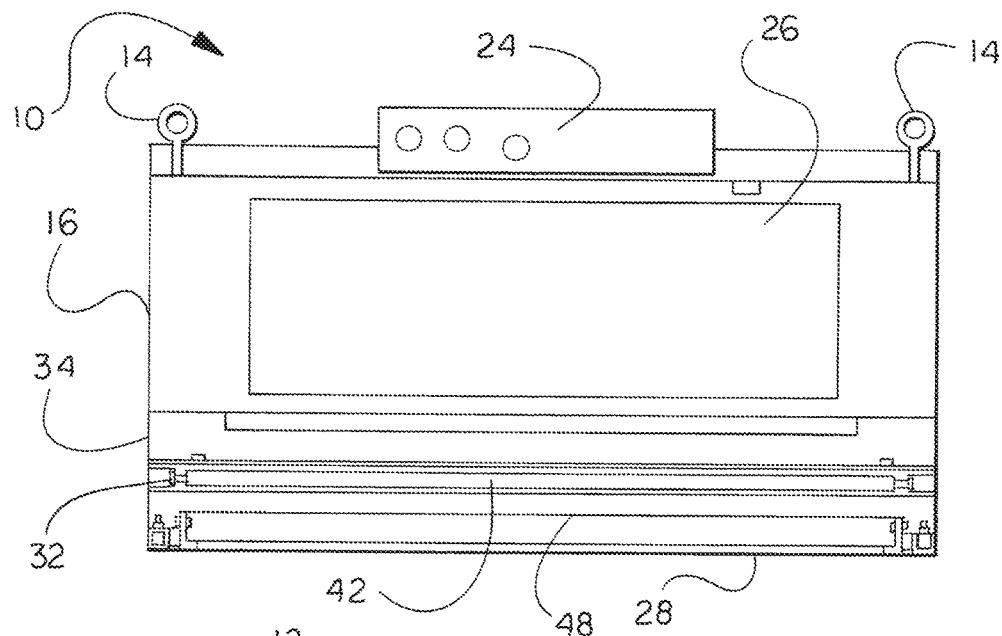
FIG. 3A is an end elevation section view of the individual laminar flow diffuser with integrated lighting in accordance with the present invention.
Figure 3B:
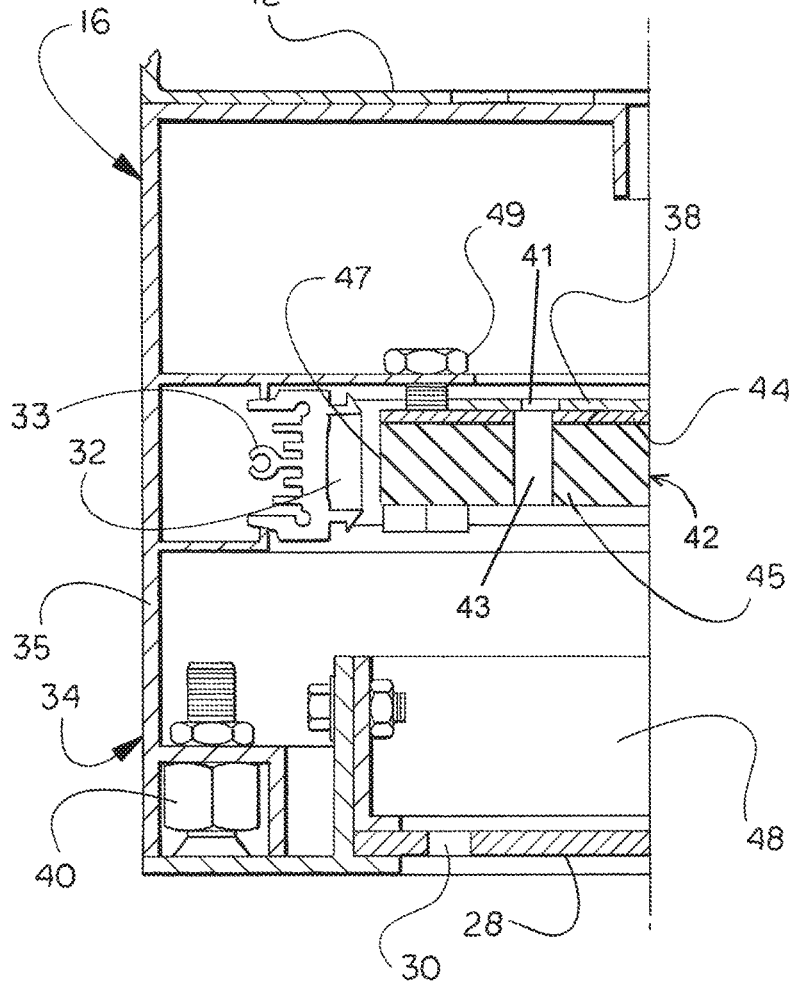
FIG. 3B is an enlarged portion of the end elevation section view of FIG. 3A of the individual laminar flow diffuser with integrated lighting in accordance with the present invention.

A series of LED lighting strips 32 are attached to the inside of the housing side panels 35 and housing end panels 36 of the lower housing 34 by means of LED light strip mounts 33 (FIG. 3B). The LED lighting strips 32 shine through the clear or translucent perforated diffuser face 28 to provide light to the room below.

With reference to FIGS. 3A-B and 4A-E, a light guide 42 is used to equalize (spread) the light emitted from the LED lighting strips 32 evenly across the area of the perforated diffuser face 28 of the laminar flow diffuser 10. The light guide 42 comprises a clear acrylic sheet 45 with a reflective layer consisting of a metal sheet 44 mounted on top of the acrylic sheet 45. In other embodiments, the reflective layer may be a reflective coating used in place of the reflective metal sheet 44 to form the reflective layer. The light guide 42 has an edge 47. Particularly, the clear acrylic sheet 45 transmits maximum light along its entire lower surface due to the 92% luminance transmittance rating. The light guide 42 is perforated with light guide openings 43 to allow for 8% to 13% free (open) area to allow air flow to pass through the light guide 42, in combination with the aperture plate damper 38 to provide adequate back pressure for air flow equalization within the common plenum, and to minimize pressure drop. The reflective metal sheet 44 reflects the light transmitted through the acrylic sheet 45 downward toward the perforated diffuser face 28 and prevents light from being emitted inefficiently from the top of the acrylic sheet 45 away from the translucent perforated diffuser face 28.

Figure 4A:
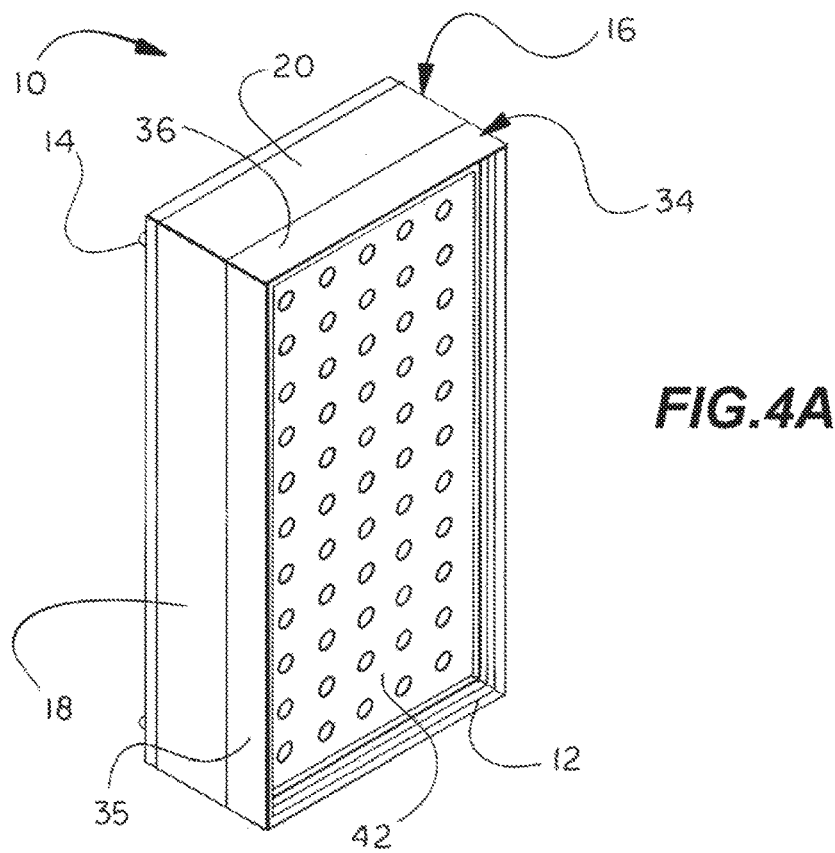
FIG. 4A is a side perspective view of the individual laminar flow diffuser with the perforated face plate removed to expose the light guide.
Figure 4B:
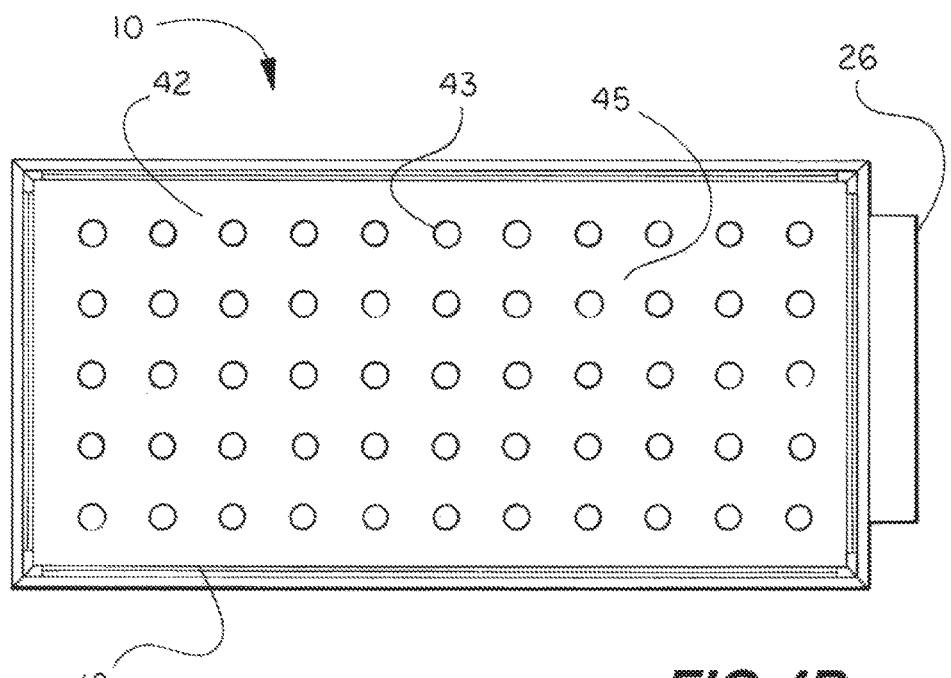
FIG. 4B is a bottom plan view of the individual laminar flow diffuser with the perforated face plate removed to expose the light guide.
Figure 4C:
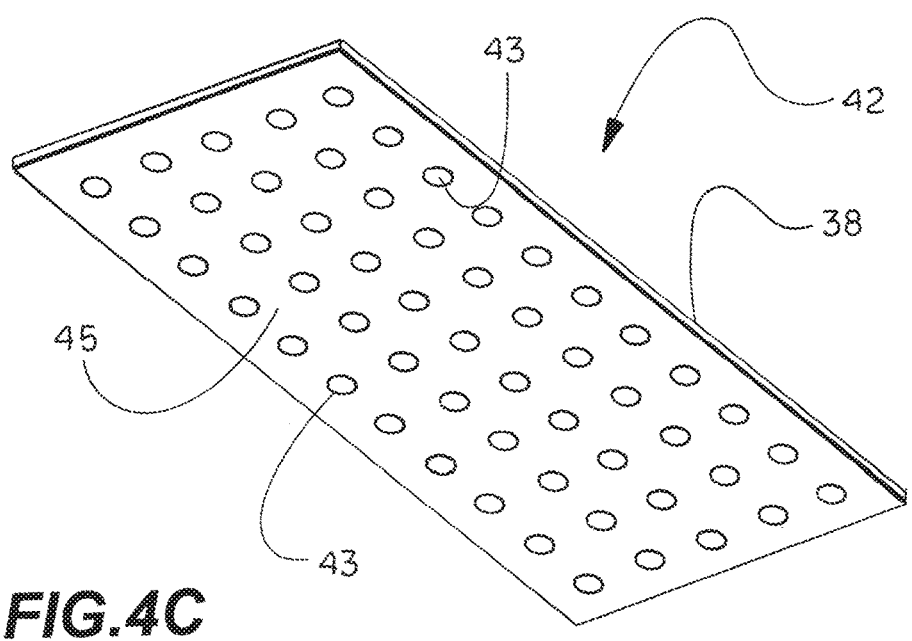
FIG. 4C is a bottom perspective view of the light guide and aperture plate damper in accordance with the present invention.
Figure 4D:
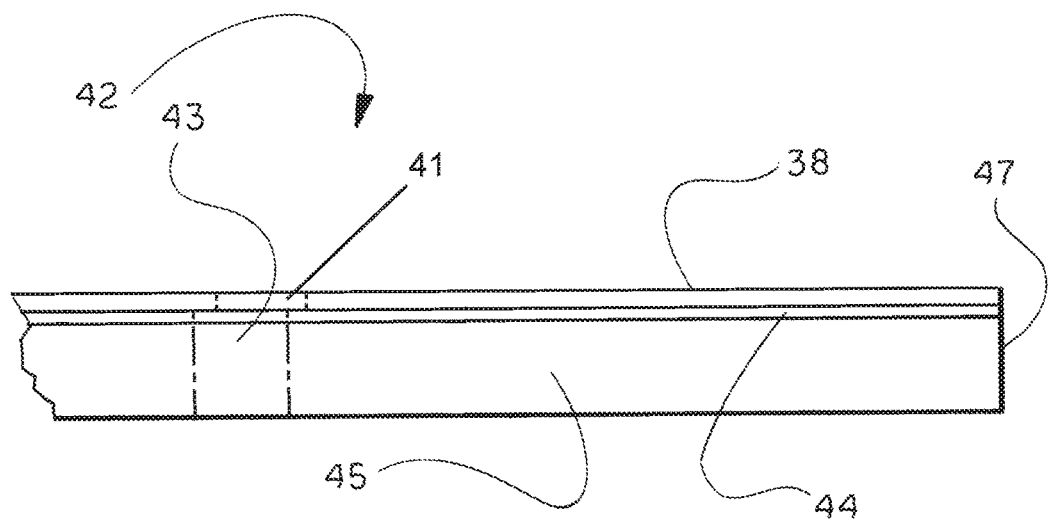
FIG. 4D is an edge view of the light guide and aperture plate damper in accordance with the present invention.
Figure 4E:
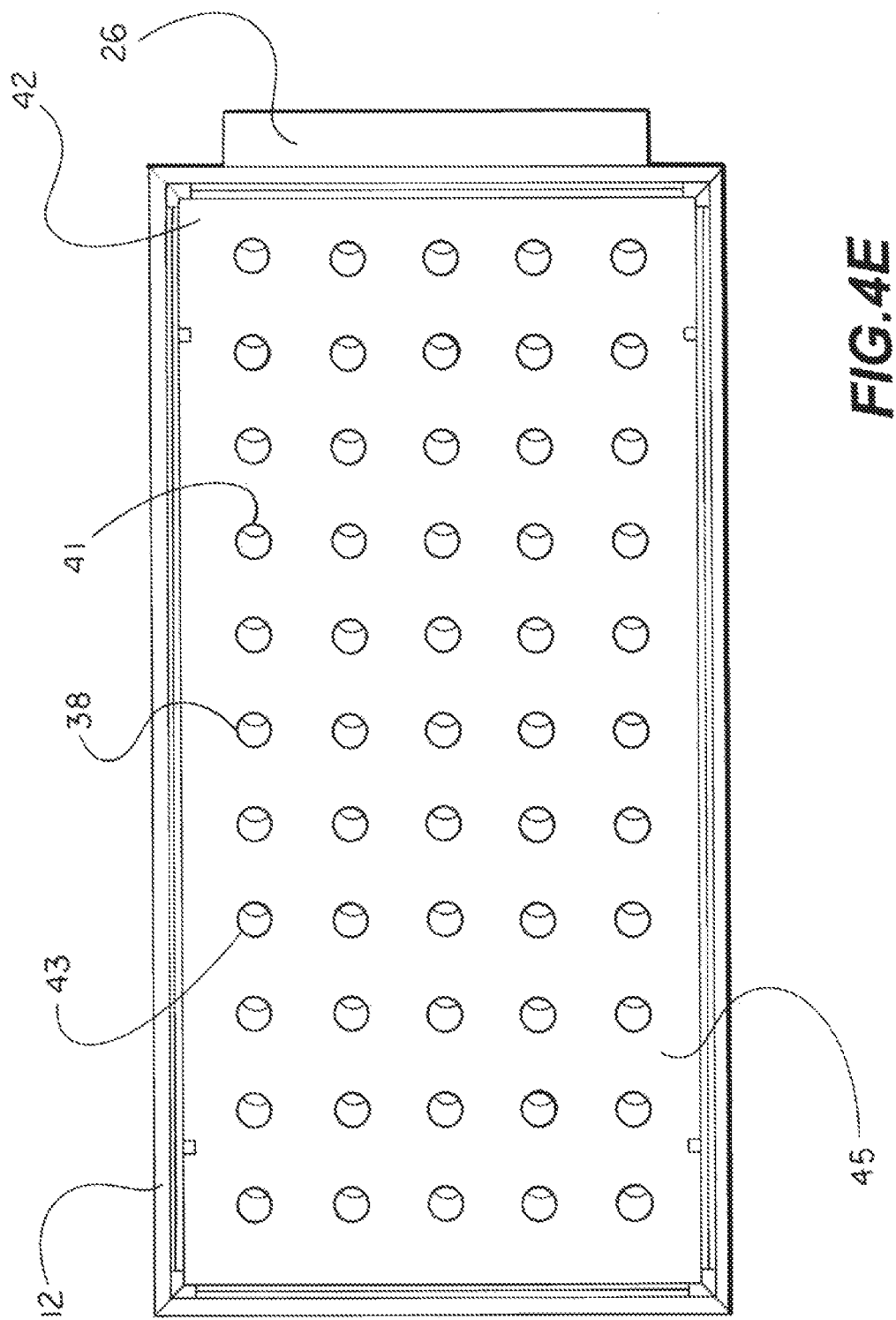
FIG. 4E is an enlarged bottom plan view of the individual laminar flow diffuser with the perforated face plate removed to expose the light guide and aperture plate damper in accordance with the present invention.
Figure 5:
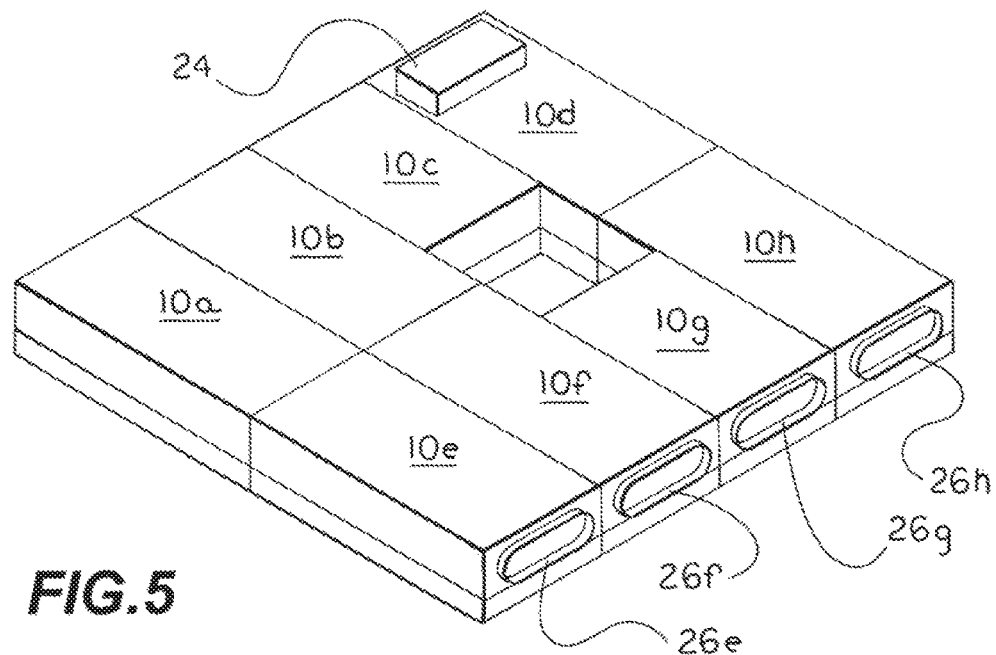
FIG. 5 is a perspective view of an integrated assembly of eight individual laminar flow diffusers with integrated lighting in accordance with the present invention.

The light guide 42 is mounted on light guide mountings 49 and is spaced above the perforated diffuser face to define an air space 48. The light guide 42 is mounted with its edges 47 in close proximity to the LED strips 32, in the same plane as the LED strips 32, above the perforated diffuser face 28, and parallel to the perforated diffuser face 28. The light produced by the LED strips 32 passes into the edges 47 of the light guide acrylic sheet 45. The light guide 42 fully equalizes (spreads) the light within the laminar flow diffuser 10 before the light is emitted from the perforated diffuser face 28 of the laminar flow diffuser 10. As shown in FIG. 3B, the light guide 42 are positioned directly above, and parallel to the perforated diffuse face 28, in order to allow the maximum amount of light transfer from the LED strips 32 to the clear or translucent perforated diffuser face 28 and thereby provide a high quality, equalized and even light to be emitted from the laminar flow diffuser. FIGS. 4A-B show the light guide 42 mounted in the lower housing 34. FIG. 4D shows the edge 47 of the light guide 42, the acrylic sheet 45, the top mounted reflective metal sheet 44, the light guide openings 43, and the aperture plate damper 38 positioned directly above the reflective sheet 44. FIG. 4E shows the light guide 42 backed by the aperture plate damper 38. As shown in FIG. 4E, the aperture plate damper 38 with openings 41 can be slid with respect to the light guide 42 (left to right in FIG. 4E) so that the light guide openings 43 can be constricted by the aperture plate damper 38 to thereby control the flow of conditioned air from the plenum 16 to the perforated diffuser face 28.

Figure 6:
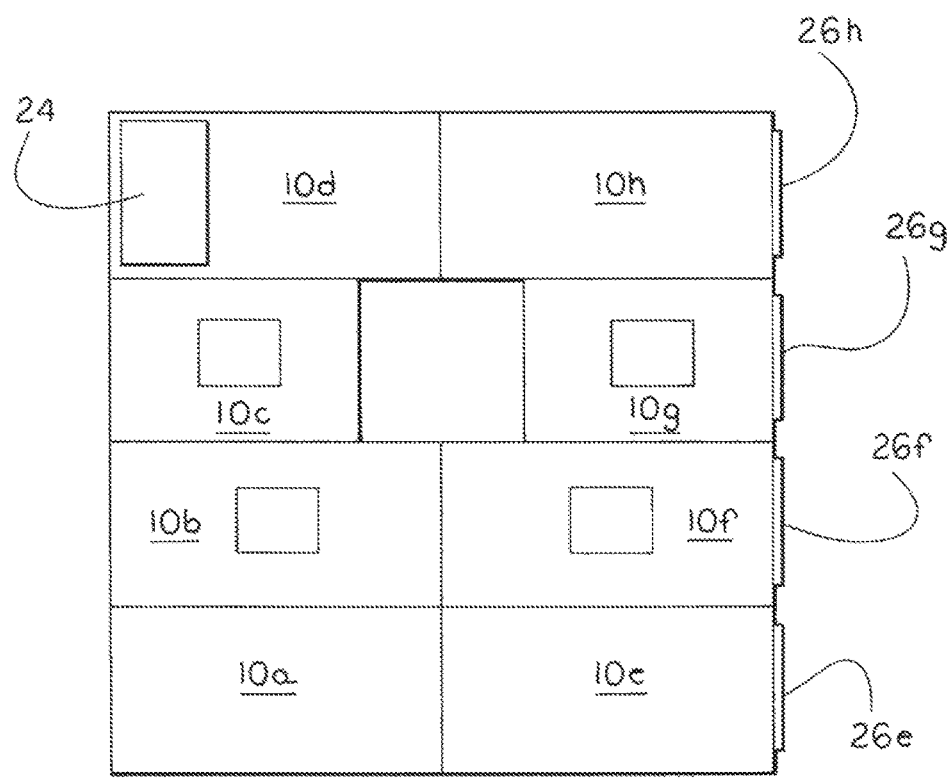
FIG. 6 is a top plan view the integrated assembly of eight individual laminar flow diffusers with integrated lighting in accordance with the present invention.

FIGS. 6-7 illustrate an integrated assembly of eight individual laminar flow diffusers 10a-h connected together. Such an integrated assembly can provide a large well lighted work area where the amount of entrained residual room air is reduced. Each of the individual laminar flow diffusers 10a-h is supplied with conditioned air from a source of conditioned air through top or side inlets 26e-h (FIGS. 6 and 7). Where conditioned air is supplied to the inlets 26e-h from a single conditioned air source, the need to balance the air flowing through the individual laminar flow diffusers may be required. The air flowing to the plenums for the individual laminar flow diffusers is internally equalized as a result of back pressure created by the light guide 42 and the aperture plate damper 38 within each laminar flow diffuser 10a-h. Balancing the air flow from each laminar flow diffuser 10a-h is accomplished by means of the face adjustable aperture plate dampers 38 installed in each laminar flow diffuser 10a-h. Electrical power is provided to each LED strip through a LED driver located in an electrical enclosures 24a-h on the top of the air plenum.

While this invention has been described with reference to preferred embodiments thereof, it is to be understood that variations and modifications can be affected within the spirit and scope of the invention as described herein and as described in the appended claims.

We claim:

1. An air diffuser with integrated lighting comprising:
   a. a frame supporting:
      i. an air plenum for receiving conditioned air from a source of conditioned air; and
      ii. a lower housing, having a peripheral panel, connected to the air plenum for receiving conditioned air from the air plenum;
   b. an aperture plate damper mounted below the air plenum to control the flow of conditioned air through the air diffuser;
   c. a clear or translucent perforated air diffuser face with openings mounted within the peripheral panel, the perforated air diffuser face forming an air outlet from the lower housing to an occupied space below the air diffuser; and
   d. at least one LED lighting strip attached to an inside surface of the peripheral panel above and displaced from the clear or translucent perforated air diffuser face.

2. The air diffuser of claim 1, wherein a light guide, with a top surface, a bottom surface, and an edge, is mounted above and displaced from the perforated diffuser face with the edge in close proximity to the LED lighting strip and wherein the lighting guide has openings between its top surface and bottom surface.

3. The air diffuser of claim 2, wherein the light guide has a reflective layer on its top surface.

4. An assembly of air diffusers comprising:
   a. a plurality of air diffusers connected together and connected to a single source of conditioned air, each air diffuser comprising:
      i. a frame supporting:
         (a) an air plenum for receiving conditioned air from the source of conditioned air; and
         (b) a lower housing, having a peripheral panel, connected to the air plenum for receiving conditioned air from the air plenum;
      ii. an aperture plate damper mounted below the air plenum to control the flow of conditioned air from the air plenum through the air diffuser, the aperture plate having aperture plate openings;
      iii. a clear or translucent perforated air diffuser face with openings mounted within the peripheral panel, the perforated air diffuser face forming an air outlet from the lower housing to an occupied space below the air diffuser; and
      iv. at least one LED lighting strip attached to an inside surface of the peripheral panel above and displaced from the clear or translucent perforated air diffuser face; and
   wherein, the conditioned air delivered to each air diffuser is determined by the configuration of the aperture plate damper openings in each air diffuser of the assembly.

5. The air assembly of claim 4, wherein a light guide, with a top surface, a bottom surface, and an edge, is mounted above and displaced from the perforated air diffuser face with the edge in close proximity to the LED lighting strip and wherein the lighting guide has openings between its top surface and bottom surface.

6. The assembly of claim 5, wherein the light guide has a reflective layer on its top surface.

\* \* \* \* \*